United States Patent [19]

Beck

[11] 4,031,766
[45] June 28, 1977

[54] ADJUSTABLE ENDLESS BELT OF UNITARY CONSTRUCTION

[76] Inventor: Paul Beck, 1100 N. Alta Loma, Los Angeles, Calif. 90069

[22] Filed: Apr. 2, 1976

[21] Appl. No.: 673,200

[52] U.S. Cl. ............................................. 74/231 J
[51] Int. Cl.² ....................................... F16G 1/00
[58] Field of Search .......... 74/231 J, 231 P, 231 R, 74/234

[56] References Cited

UNITED STATES PATENTS

| | | | |
|---|---|---|---|
| 3,748,699 | 7/1973 | Cunningham | 74/231 J |
| 3,777,586 | 12/1973 | Stirton | 74/231 J |
| 3,988,940 | 11/1976 | Szonn et al. | 74/231 J |

*Primary Examiner*—Leonard H. Gerin
*Attorney, Agent, or Firm*—Lyon & Lyon

[57] ABSTRACT

Disclosed herein is an adjustable endless belt of unitary construction particularly adapted for use in high speed power transmission and commonly termed a fan belt. The belt is comprised of a length of flexible and durable polymeric material, one end thereof defining an elongated male end portion of reduced diameter and the other end having a longitudinal channel therein extending from said end a distance equal to the length of the aforesaid male elongated end portion. In defining the endless belt, the desired size is determined by extending the length of material about the pulleys upon which it is to be mounted; overlapping the two extended end portions until the desired tension and consequently belt length or size is determined; severing an equal length of material from each end; inserting the remaining extended male end portion into the channeled end; and securing the male end therein by a suitable polymeric glue.

11 Claims, 5 Drawing Figures

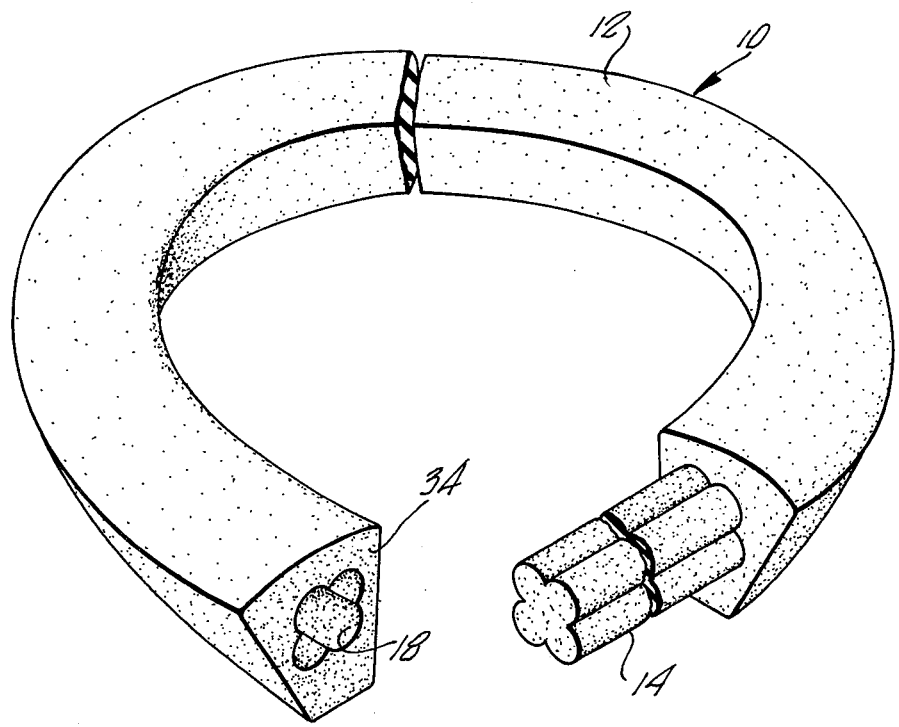
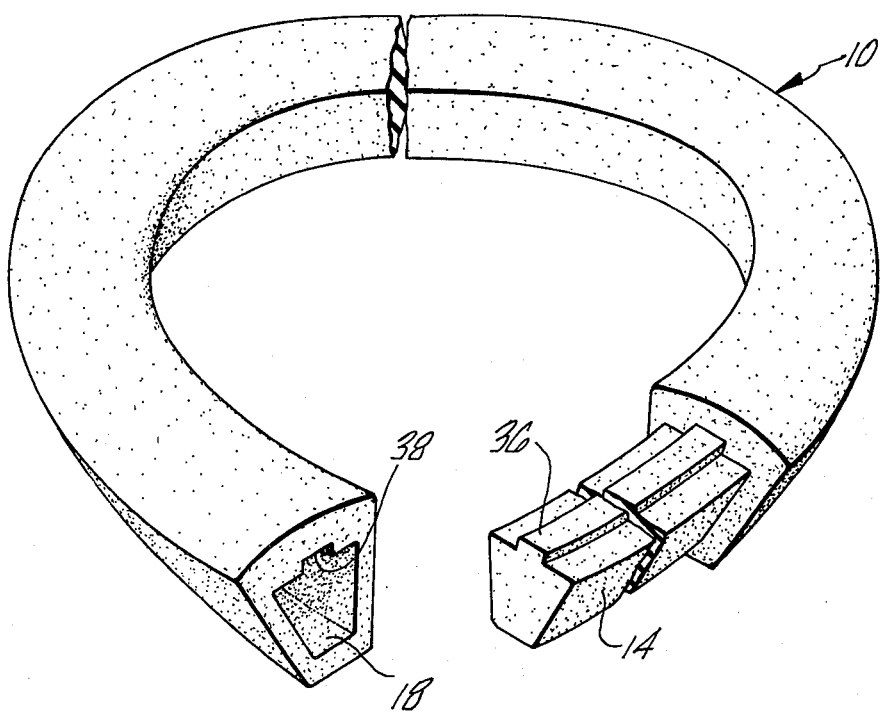

ADJUSTABLE ENDLESS BELT OF UNITARY CONSTRUCTION

BACKGROUND OF THE INVENTION

The endless belts used for moderate load power transmission application in automobiles, which are more commonly collectively termed fan belts, are constructed of a flexible, tear-resistant polymeric material and are manufactured in countless different sizes to accomodate the varying pulley sizes and spacings therebetween found in the vast number of different models of automobiles sold and driven in the United States and foreign countries. While these endless belts are quite durable, they nevertheless are subjected to a great deal of stress due to their high speed operation and consequently must be periodically replaced. Consequently for a garage to be able to meet the needs of its customers, it is necessary to stock a great deal of different sized belts. This presents a substantial inventory problem to the garage as these belts are of a fixed size and consequently a belt suitable for one make of automobile cannot generally be used in another unless the size requirements are the same. Unfortunately, this is not generally the case.

In addition to having to stock a large inventory of these belts, a garage mechanic must often expend a good deal of labor in securing the belt about the pulleys due to the limited flexibility inherent in such belts and the often encountered awkward positioning of the pulleys with respect to the automobile body presenting the mechanic with restricted access for mounting the belt on the pulleys.

The problems of fixed belt size and installation could be greatly relieved if the belt were either adjustable or of a construction whereby it could be readily assembled to the desired size about the pulleys. While several fastening means have been available for the purpose of connecting two free ends of belting together for form a continuous length, i.e., hose couplings, such means are impractical in such an installation due to their flanges, barbs, etc., which damage both the pulleys and the belting. Other means such as that taught in U.S. Pat. No. 3,501,971 employ the use of a separate insert to join the extended hollowed lengths of the belt together. The use of such an insert, however, leaves the constructed belt with hollow portions adjacent the ends of the insert which result in a discontinuity of belt construction, creating weak spots in the belt and a weight imbalance which could cause the belt to work itself off the pulleys and wear unevenly. Consequently such a design presents a poor solution. It would be highly desirable to provide such an endless belt which can be assembled about the pulleys and thereby obviate the need for a large inventory of differently sized belts, if one could be provided which is free of any protrusions caused by the coupling as well as one of continuously solid construction for maximum strength and durability. The endless belt described below is of such a construction.

SUMMARY OF THE INVENTION

Briefly, the invention comprises a length of flexible tear-resistant material, one end of which is of reduced diameter to define an extended male end and the other end thereof is provided with a longitudinal channel to define a female end adapted to the male end. Upon disposing the length of material about the particular pulleys and thereby determining the desired size of the belt, the excess material from the female end is severed therefrom as is an equal length from the male end such that upon disposing the male end within the female end, the extended end of the male end abuts the inner end of the longitudinal channel in the female end to define a continuous solid belt of the proper size for the pulley arrangement in question. The male end is secured within the female end by a suitable polymeric glue.

It is the principal object of the present invention to provide an endless belt for power transmission which is of unitary construction and size adjustable.

It is another object of the present invention to provide an endless belt for power transmission which is free from any external protrusions in the area of the coupling.

It is another object of the present invention to provide an adjustable endless belt for power transmission which is continuously solid throughout the length thereof.

It is yet another object of the present invention to provide an adjustable endless belt for power transmission which is of simple construction and economical to manufacture.

It is a still further object of the present invention to provide an endless belt for power transmission which is readily adaptable for use in different automobiles having different sized requirements.

These and other objects and advantages of the present invention will become apparent from the following detailed description taken in conjunction with the accompanying drawings.

BRIEF DESCRIPTION OF THE DRAWINGS

FIG. 4 is a perspective view of a second embodiment of the invention.

FIG. 5 is a perspective view of the invention illustrating a guide rib and guide channel.

Figure 1:
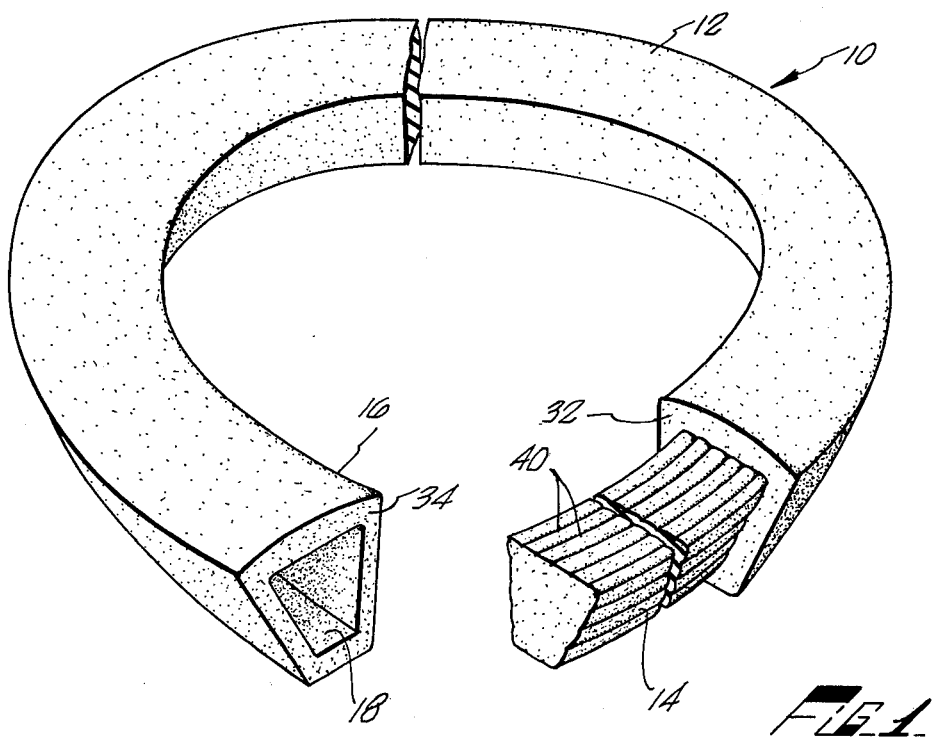
FIG. 1 is a perspective view of the belt prior to assembly.
Figure 2:
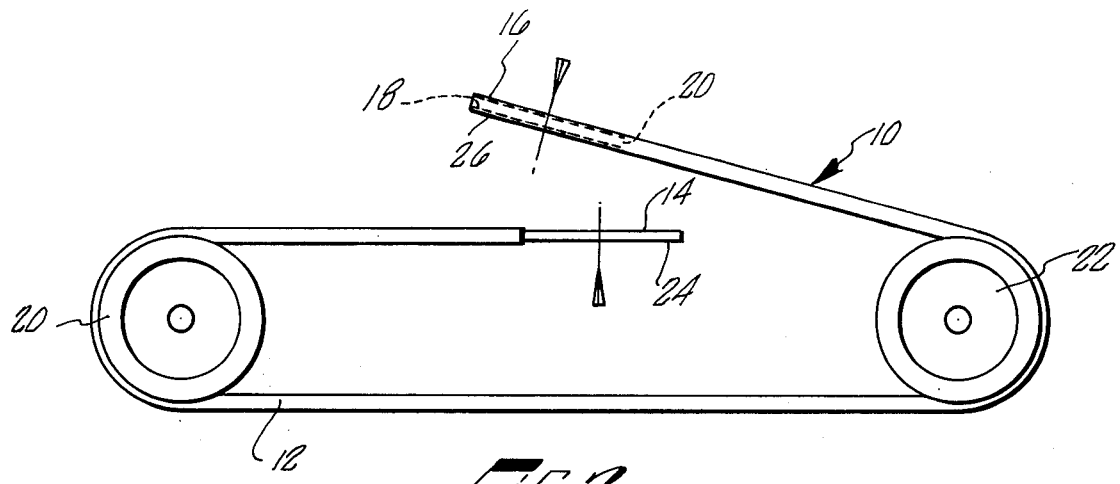
FIG. 2 illustrates the belt disposed about a pair of pulleys for sizing.
Figure 3:
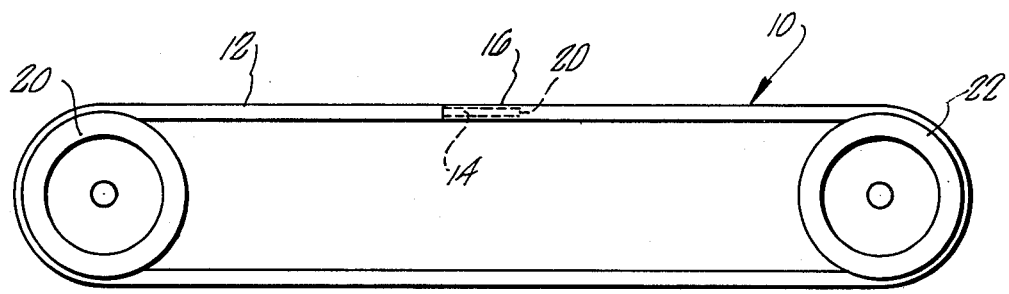
FIG. 3 is a cross-sectional view of the belt disposed about the pulleys.

Referring now in detail to the drawings, the endless belt 10 is seemed to be comprised on a length 12 of flexible tear-resistant material, preferably of polymeric construction, having an elongated male end 14 which is of a reduced diameter and a female end 16. The female end has a longitudinal channel 18 therein terminating in an end wall 20 and being of equal in length to the male end 14. In defining the endless belt 10, the length of material 12 is disposed about the pulleys 20 and 22 about which the belt is to be mounted and the ends thereof are drawn together to the desired tension as illustrated in FIG. 2. The excess length 24 of the female end is then marked and severed therefrom. An equal length 26 of the male end is correspondingly severed from the length 12 and a suitable polymeric glue (not shown) is then placed over the remaining male end portion. The length 12 is again disposed about the pulleys and the male end is inserted into the female end until the extended end thereof abuts the end wall 20 of the female end 16 as shown in FIG. 3. At this point the flat contact surface 32 from which the elongated male end 14 extends abuts the extended 34 of the female end to define the continuous end belt 10 solid throughout its length and having a continuous external surface free from any irregularities.

In the preferred embodiment of the invention illustrated in the drawings, the male and female end portions are of the same configuration as the belt itself. Although in a second embodiment illustrated in FIG. 4 a clover configuration could be employed to provide an increased surface contact area therebetween. Additionally, the male end portions can be provided with a guide ridge 36 which is received in a corresponding groove 38 in the channel in the female end (see FIG. 5) to assure proper alignment of the belt during construction. Furthermore, narrow grooves 40 can be depressed in either the male or female end of the belt to accomodate the polymeric glue.

It is to be understood that while polymeric glues have been found to be highly suited for the above construction, other glues having similar holding properties could also be employed. Other changes and modifications may be made in carrying out the present invention without departing from the spirit and scope thereof. Insofar as these changes and modifications are within the purview of the appended claims they are to be considered as part of the invention.

I claim:

1. A continuously adjustable endless belt of unitary construction for use in power transmission comprising a length of flexible tear-resistant material, one end thereof being of reduced diameter and defining an extended male end portion, the other end of said length having a longitudinal channel therein adapted to receive said male portion, said channel and said male portion being of equal lengths such that upon disposing said male portion within said channel a continuous endless solid belt is defined.

2. An endless belt of unitary construction for use in power transmission comprising a length of flexible tear-resistant material, one end thereof being of reduced diameter and defining an extended male end portion, the other end of said length having a longitudinal channel therein adapted to receive said male portion, said channel and said male portion being of equal lengths and clover shaped in cross-section such that upon disposing said male portion within said channel a continuous endless solid belt is defined.

3. An endless belt of unitary construction for use in power transmission comprising a length of flexible tear-resistant material, one end thereof being of reduced diameter defining an annular contact surface and a male end portion extending therefrom, the other end of said length having a longitudinal channel therein terminating in an end wall, said channel and said male end portion being of equal length such that upon severing equal portions from the ends of said male and female ends portions and disposing said male portion fully within said longitudinal channel, the extended end of said male portion abuts said end wall of said channel and said annular contact surface of said male portion abuts the extended end of said female portion to define a continuous endless solid belt.

4. The combination of claim 3 wherein said male end portion and said longitudinal channel are clover-shaped and cross-sectioned to increase surface contact therebetween.

5. The combination of claim 3 including a raised longitudinal ridge portion on said male end portion and a longitudinal slot extending from and communicating with said longitudinal channel and being adapted to receive said ridge portion to guide and maintain said male portion in proper alignment within said female portion.

6. An endless belt of unitary construction for use in power transmission comprising a length of flexible tear-resistant material, one end thereof being of reduced diameter and defining an extended male end portion, the other end of said length having a longitudinal channel therein, said channel and said male end portions being of equal lengths and said male end portions being disposed within said channel, and a polymeric glue disposed about said male portion within said channel to maintain said male portion within said channel.

7. The combination of claim 6 wherein said male end portion and said longitudinal channel are clover shaped and cross-sectioned to increase surface contact therebetween.

8. A length of flexible tear-resistant material, one end thereof being of reduced diameter defining an annular contact surface and a male end portion extending therefrom, the other end of said length having a longitudinal channel therein terminating in an end wall, said male portion being disposed within said longitudinal channel, the extended end of said male portion abutting said end wall and said annular contact surface of said male portion abutting the extended end of said female portion, and a polymeric glue disposed within said channel between said male portion and said female portion.

9. The combination of claim 8 wherein said male end portion and said longitudinal channel are clover shaped and cross-sectioned to increase surface contact therebetween.

10. The combination of claim 8 including a raised longitudinal ridge portion on said male end portion and a longitudinal slot in said female portion extending from and communicating with said longitudinal channel, said ridge portion being disposed within said slot to maintain said male portion in proper alignment with said female portion.

11. The combination of claim 8 wherein said material is polymeric.

* * * * *